(12) United States Patent
Bernacki et al.

(10) Patent No.: US 10,726,370 B1
(45) Date of Patent: Jul. 28, 2020

(54) METHOD AND SYSTEM FOR AUTOMATIC CONTEXTUAL TASK PRESENTATION

(71) Applicant: ZEBRA TECHNOLOGIES CORPORATION, Lincolnshire, IL (US)

(72) Inventors: John A. Bernacki, Thornhill (CA); James S. L. Chen, Brampton (CA); Andrew Pierce, Guelph (CA); Matthew Adam Van Sickle, Milton (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/384,565

(22) Filed: Apr. 15, 2019

(51) Int. Cl.
*G06Q 10/06* (2012.01)
*G06K 7/14* (2006.01)
*G09G 5/00* (2006.01)
*G02B 27/01* (2006.01)
*G06F 3/147* (2006.01)

(52) U.S. Cl.
CPC ... *G06Q 10/06316* (2013.01); *G02B 27/0172* (2013.01); *G06F 3/147* (2013.01); *G06K 7/1413* (2013.01); *G09G 5/003* (2013.01); *G02B 2027/014* (2013.01); *G02B 2027/0178* (2013.01)

(58) Field of Classification Search
CPC .... G09G 5/003; G06F 3/147; G02B 27/0172; G02B 2027/014; G02B 2027/0178; G06Q 10/06316; G06K 7/1413
See application file for complete search history.

(56) References Cited

U.S. PATENT DOCUMENTS

| 10,127,632 | B1* | 11/2018 | Burke | G06T 3/4038 |
| 2011/0102455 | A1* | 5/2011 | Temple | G06F 3/0346 345/619 |
| 2017/0003750 | A1* | 1/2017 | Li | G06F 3/017 |

OTHER PUBLICATIONS

International Search Report and Written Opinion for International Patent Application No. PCT/US2020/016634 dated Apr. 1, 2020.

* cited by examiner

*Primary Examiner* — Muhammad N Edun (57) ABSTRACT

A method, in a computing device, of automatic contextual task presentation, includes: storing, in a memory of the computing device, a sequence of task instructions for presentation to an operator of the computing device via an output assembly connected to the mobile computing device; detecting, via an input assembly of the computing device, a task initiation event; responsive to detecting the task initiation event: controlling the output assembly to present a first task instruction from the sequence to the operator; obtaining orientation data corresponding to the operator from an inertial measurement unit associated with the computing device; based on the orientation data, tracking an accumulated operator orientation change since the detection of the task initiation event; and when the accumulated operator orientation change exceeds a threshold, controlling the output assembly to present a second task instruction from the sequence to the operator.

22 Claims, 6 Drawing Sheets

METHOD AND SYSTEM FOR AUTOMATIC CONTEXTUAL TASK PRESENTATION

BACKGROUND

Tasks such as warehouse picking require workers to travel throughout a facility and retrieve various objects, e.g. for subsequent packaging and shipping. A number of systems for guiding workers within the facility exist. For example, a pick-to-light system places light indicators throughout the facility that illuminate to instruct workers which objects to retrieve. Such systems, however, can be costly and time-consuming to deploy and maintain.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, in a computing device, of automatic contextual task presentation, the method comprising: storing, in a memory of the computing device, a sequence of task instructions for presentation to an operator of the computing device via an output assembly connected to the mobile computing device; detecting, via an input assembly of the computing device, a task initiation event; responsive to detecting the task initiation event: controlling the output assembly to present a first task instruction from the sequence to the operator; obtaining orientation data corresponding to the operator from an inertial measurement unit associated with the computing device; based on the orientation data, tracking an accumulated operator orientation change since the detection of the task initiation event; and when the accumulated operator orientation change exceeds a threshold, controlling the output assembly to present a second task instruction from the sequence to the operator.

Additional examples disclosed herein are directed to a computing device, comprising: a memory storing a sequence of task instructions for presentation to an operator of the computing device via an output assembly connected to the computing device; an input assembly configured to detect a task initiation event; a processor connected to the sensor and the memory; wherein the processor is configured to: responsive to receipt of a detection of the task initiation event from the input assembly: control the output assembly to present a first task instruction from the sequence to the operator; obtain orientation data corresponding to the operator from an inertial measurement unit; based on the orientation data, track an accumulated operator orientation change since the detection of the task initiation event; and when the accumulated operator orientation change exceeds a threshold, control the output assembly to present a second task instruction from the sequence to the operator.

Figure 1:
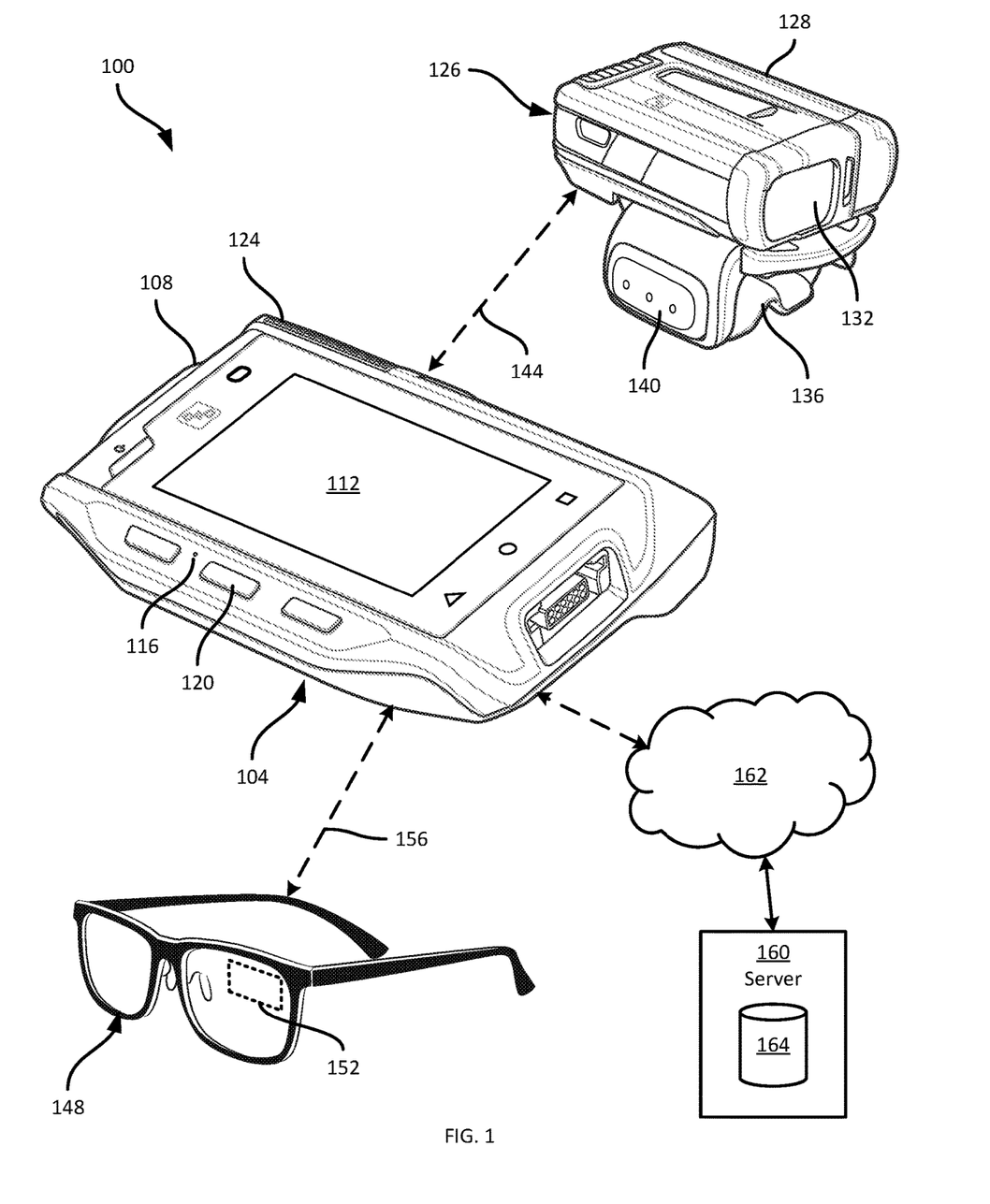
FIG. 1 is a schematic of a system for automatic contextual task presentation.

FIG. 1 depicts a system 100 for automatic contextual task presentation. The system 100 can be deployed in a warehouse environment or the like, in which one or more workers pick objects from supports structures such as racks, shelves or the like for packaging and shipping. As will be apparent to those skilled in the art, the system 100 can also be deployed in other environments, such as retail facilities and the like.

The system 100 includes a mobile computing device 104, also referred to herein simply as the device 104. The mobile computing device 104 is illustrated as a wearable computer, which may be mounted to a wrist, arm, belt or the like of an operator. In other embodiments, however, the device 104 can have another suitable form-factor, including that of a smart phone, a laptop computer, a tablet computer, a hand-held mobile computer (e.g. including a pistol grip) or the like. The device 104 includes a housing 108 supporting input and output devices, including a display 112, which may include an integrated touch screen. Other input devices supported by the housing 108 can also include a microphone 116, and one or more buttons 120. Other output devices supported by the housing 108 can include a speaker 124. The housing 108 also supports various internal components of the device 104, to be discussed in greater detail below.

The system 100 also includes a data capture device 126 in the present example, shown in FIG. 1 as a hand-mounted barcode scanner and therefore also referred to herein as the scanner 126. In general, the data capture device 126 enables an operator of the device 104 and the scanner 126 to obtain data from machine-readable indicia such as barcodes affixed to objects such as packages. In other embodiments, the scanner 126 can be integrated with the device 104. In still further embodiments, the scanner 126 can be omitted.

The scanner 126 includes a housing 128 supporting a data capture assembly, of which an imaging window 132 is shown. The data capture assembly can include a image-based or laser-based barcode scanner and associated control and decoding hardware. The scanner 126, being hand-mounted in the present example, also includes a strap 136 for mounting to the hand (e.g. on one or more fingers) of an operator such as a worker in the above-mentioned warehouse. The scanner 126 further includes a trigger 140 or other input assembly employed to activate the data capture assembly. The scanner 126 and the device 104 are configured to communicate via a link 144, such as a wireless link (e.g. Bluetooth™). In other examples, the link 144 can be wired rather than wireless.

The system 100 further includes an auxiliary output device, implemented in the present example as a wearable heads-up-display (HUD) 148. The HUD 148, as shown in FIG. 1, includes a glasses frame and suitable display hardware (e.g. projection hardware or the like) to present visual information on a region 152 of the glasses. The HUD 148 also includes a communication interface to communicate with the device 104 via a link 156, such as a further Bluetooth™ link. The device 104 is therefore enabled to transmit data to the HUD 148 for display at the region 152.

As will be discussed in greater detail below, the device 104, the scanner 126 and the HUD 148 are carried by an operator, and are configured to automatically present task-related information to the operator via the region 152. More specifically, the device 104 is configured to automatically update the information presented at the region 152 in response to certain events detected by one or more of the device 104, the HUD 148 and the scanner 126.

The above-mentioned task-related information, in the present example, defines picking tasks to be performed by the operator. That is, the task information defines locations within the deployment environment (e.g. a warehouse) to which the operator is to travel and retrieve certain objects. The task information may also identify the specific object to be retrieved, as well as the number of such objects to be retrieved. As will now be apparent to those skilled in the art, numerous such tasks may be required of the operator, each specifying a different type of object (and number of such objects) to retrieve. To that end, the system 100 may also include a server 160 connected to the device 104 via a network 162 and storing a repository 164 of task instructions. The task instructions may be deployed to the device 104 (e.g. in batches, or one at a time) for presentation to the operator of the device 104 in sequence. Progression through the sequence is controlled at least partly automatically by the device 104 and the HUD 148.

Figure 2:
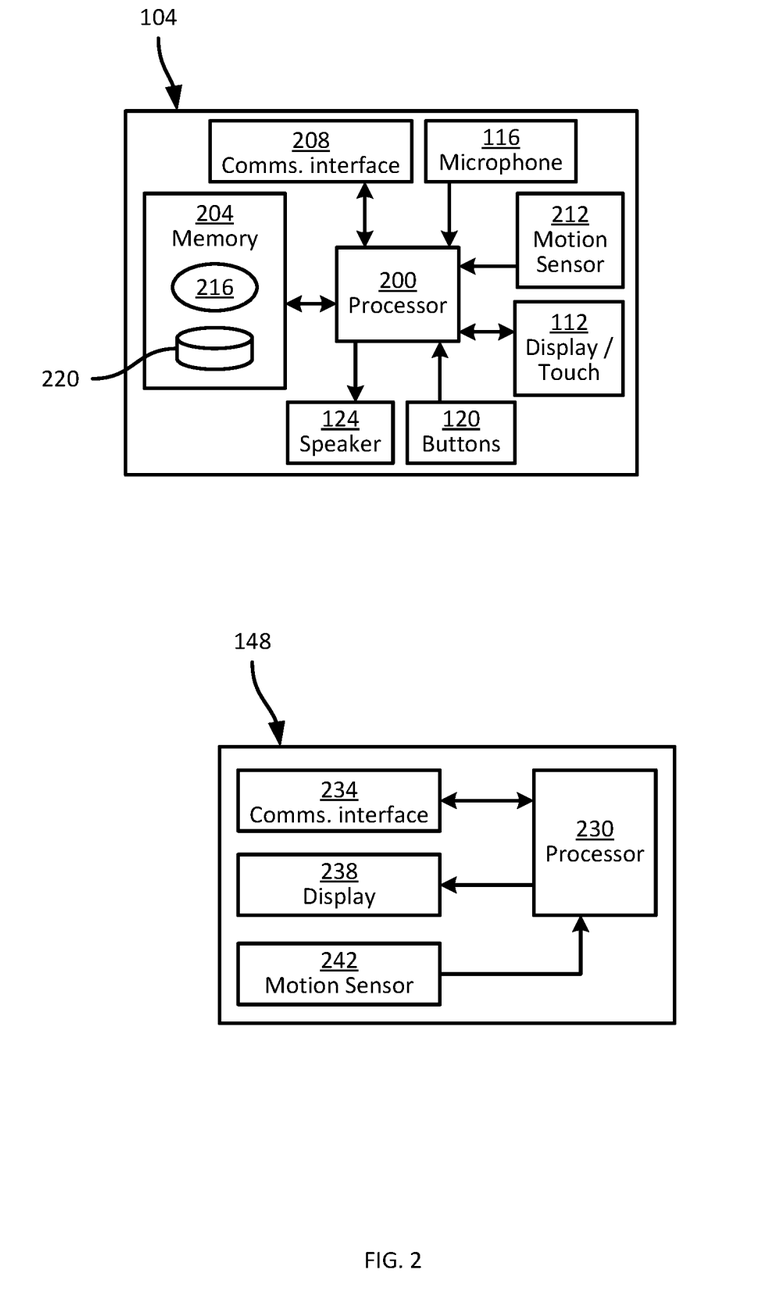
FIG. 2 is a block diagram of certain internal hardware components of the mobile computing device of FIG. 1, and of the wearable heads-up-display of FIG. 1.

Turning to FIG. 2, before discussing the operation of the system 100 in further detail, certain internal components of the device 104 and the HUD 148 will be discussed in greater detail.

As shown in FIG. 2, the device 104 includes a central processing unit (CPU), also referred to as a processor 200, interconnected with a non-transitory computer readable storage medium, such as a memory 204. The memory 204 includes a suitable combination of volatile memory (e.g. Random Access Memory (RAM)) and non-volatile memory (e.g. read only memory (ROM), Electrically Erasable Programmable Read Only Memory (EEPROM), flash). The processor 200 and the memory 204 each comprise one or more integrated circuits (ICs).

The components of the device 104 shown in FIG. 1 (e.g. the display and touch screen 112, microphone 116, buttons 120 and speaker 124) are interconnected with the processor 200 via one or more communication buses. The device 104 also includes a communications interface 208 enabling the device 104 to exchange data with other devices, including the scanner 126, the HUD 148 and the server 160. The communications interface 208 therefore includes any suitable hardware (e.g. transmitters, receivers, network interface controllers and the like) allowing the device 104 to communicate with such other devices.

The device 104 can also include a motion sensor 212. The motion sensor 212 includes an inertial measurement unit (IMU) including one or more accelerometers and one or more gyroscopes. The motion sensor 212, in other words, is configured to detect acceleration of the device 104 in three dimensions, as well as changes in orientation of the device 104 in three dimensions, and to transmit data indicating such acceleration and orientation changes to the processor 200. In other embodiments, the motion sensor 212 is omitted. The components of the device 104 are interconnected by the above-mentioned communication buses, and powered by a battery or other power source, over the communication buses or by distinct power buses (not shown).

The memory 204 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a task presentation application 216, also referred to herein as the application 216. The device 104 is configured, via execution of the application 216 by the processor 200, to present task information to the operator, e.g. via the HUD 148, in response to certain events detected by the processor 200. The task information itself can also be stored in the memory 204, for example in a repository 220 obtained from the server 160 (e.g. being a subset of the repository 164 mentioned in connection with FIG. 1).

The HUD 148, as shown in FIG. 2, includes a processor 230 interconnected with a communication interface 234 and a display assembly 238. The communication interface 234 enables the HUD 148 to communicate with other computing devices, such as the device 104, and therefore includes any suitable combination of transmitters, receivers, network interface controllers and the like necessary to enable such communications. The display assembly 238 includes any suitable display hardware, such as display films, projectors, and the like, controllable by the processor 230 to present data received from the device 104 at the region 152 shown in FIG. 1.

The HUD 148 can also include a motion sensor 242, such as an IMU, configured to capture data indicating changes in orientation and accelerations of the HUD 148, for transmission to the device 104 via the processor 230 and communications interface 234. In other embodiments, one of the motion sensors 212 and 242 is omitted. That is, the functionality discussed below that relies on motion data captured by an IMU can be implemented with either of the motion sensors 212 and 242, and the other motion sensor can be omitted from the system 100.

In further embodiments, one or both of the processors 200 and 230 are implemented as one or more specifically-configured hardware elements, such as field-programmable gate arrays (FPGAs) and/or application-specific integrated circuits (ASICs).

Figure 3:
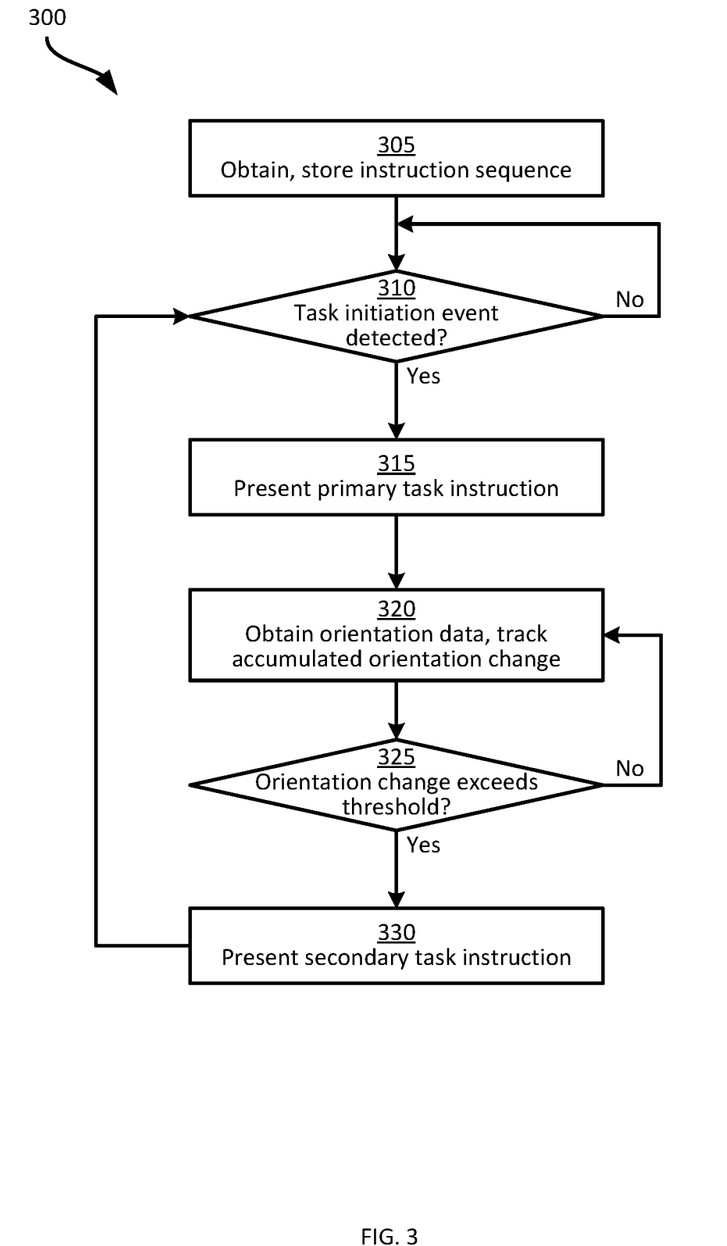
FIG. 3 is a flowchart of a method of automatic contextual task presentation.

Turning now to FIG. 3, the operation of the system 100 will be described in further detail. FIG. 3 illustrates a flowchart of a method 300 of automatic contextual task presentation. The performance of the method 300 will be described in conjunction with its performance within the system 100. In particular, the blocks of the method 300 in the discussion below are performed by the device 104, via execution of the application 216 by the processor 200.

At block 305, the device 104 is configured to obtain and store a sequence of task instructions in the memory 204. For example, the device 104 can be configured to obtain the task instructions by transmitting a request to the server 160 via the network 162. The request may include one or more of a location of the device 104, and/or an identifier of the device 104 (e.g. an account identifier associated with the current operator of the device 104, or the like). In response to the request, the server 160 can be configured to retrieve a set of task instructions from the repository 164 and transmit the task instructions to the device 104 for storage in the local repository 220 and subsequent presentation via the HUD 148.

The task instructions each define a task to be performed by the operator of the device 104. For example, a sequence of task instructions can define an initial task to travel to a certain location within a warehouse, and to scan a barcode associated with a specified object at that location. The task instruction can therefore include data indicating the location and an identifier of the object. The task instruction may also include a text string, audio file or the like instructing the operator to scan the above-mentioned barcode (e.g. with the scanner 126) upon arrival at the specified location.

A subsequent task instruction in the above-mentioned example sequence can define a further task to retrieve a specified number of the objects from the above location. Such as task instruction can therefore include data defining the object identifier noted above, as well as a required quantity. The task instruction can also include further location data, for example indicating a precise location on a rack, shelf or other support structure from which the objects are to be retrieved. Yet another task instruction in the sequence can define a further task to place the retrieved objects in a cart, tote or the like carried (or pushed) by the operator of the device 104. The task instruction therefore includes data defining, for example, which tote or other location in which the retrieved objects are to be placed.

Figure 4A:
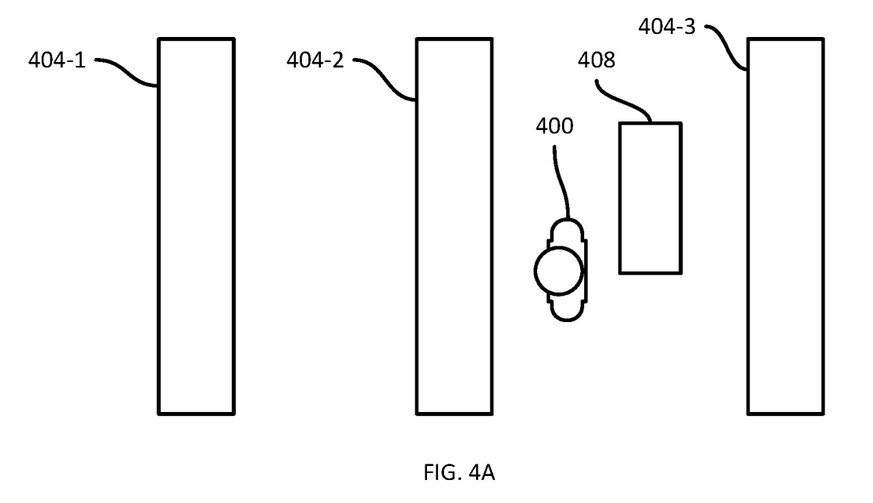
FIG. 4A is an overhead view of a facility implementing the system of FIG. 1.
Figure 4B:
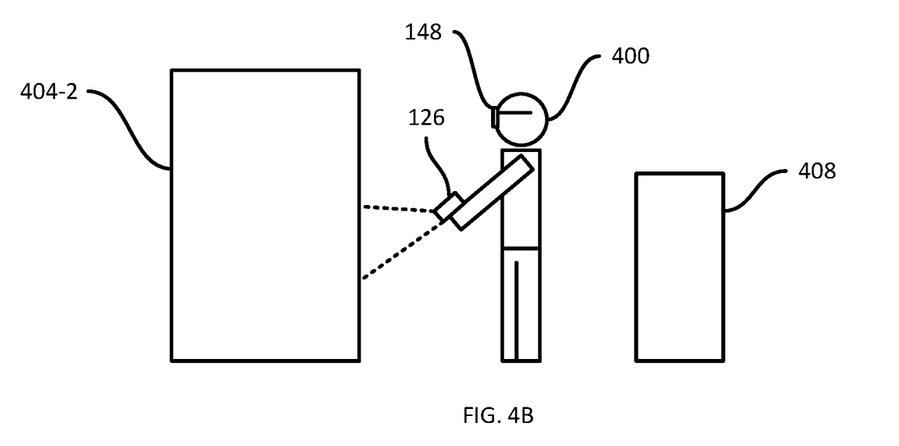
FIG. 4B is a side view of a portion of the facility of FIG. 4A.

At block 310, the device 104 is configured to determine whether a task initiation event has been detected via an input assembly such as the data capture assembly of the scanner 126. The performance of block 310 is illustrated in FIGS. 4A and 4B. Prior to the performance of block 310, it is assumed that the device 104 controls the HUD to present an initial instruction to the operator 400 to travel to a particular location amongst a plurality of racks 404-1, 404-2, 404-3 in a warehouse facility with a cart 408. The initial instruction further commands the operator 400 to scan a barcode (or capture data from another indicium, such as an RFID tag or the like) associated with a given object. FIG. 4A illustrates an overhead view of the facility following arrival of the operator 400 at the specified location. In other embodiments, the above-mentioned task display by the HUD 148 can be omitted. For example, the operator 400 may have received the initial instruction by another suitable mechanism.

Figure 4C:
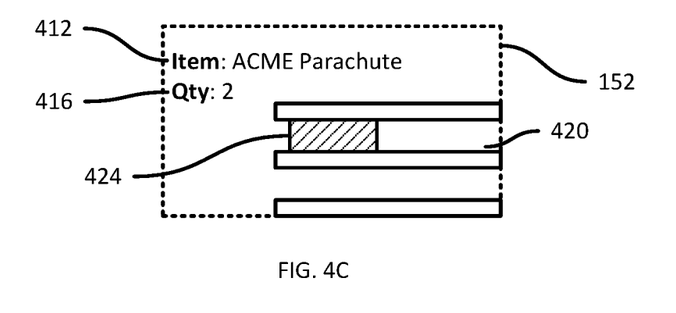
FIG. 4C is a schematic of information presented by the wearable heads-up-display of FIG. 1.

As shown in FIG. 4B, the operator 400 controls the scanner 126 to capture the barcode noted above, resulting in an affirmative determination at block 310. When the determination at block 310 is negative, the device 104 awaits detection of the task initiation event. Returning to FIG. 3, at block 315, responsive to detection of a task initiation event, the device 104 is configured to retrieve a primary task instruction from the memory 204 (e.g. from the repository 220), and to present the primary task instruction via the HUD 148. As shown in FIG. 4C, the primary task instruction presented at the region 152 of the HUD 148 includes an identifier 412 of an object to be retrieved from the rack 404-2, as well as a quantity 416 of the object to be retrieved. The primary task instruction can also include a visual depiction 420 of the rack 404-2, including an indicator (e.g. a highlight or other visual feature) 424 of the specific location on the rack 404-2 from which the item(s) is/are to be retrieved.

Returning to FIG. 3, at block 320, the device 104 is configured to obtain orientation data corresponding to the operator 400. The orientation data is obtained from an IMU, and specifically from one of the motion sensors 212 and 242 mentioned above in connection with FIG. 2. As will be apparent to those skilled in the art, the IMUS 212 and 242 generate data indicative of acceleration in three dimensions (i.e. along each of three axes), and of rotation in three dimensions (i.e. about each of three axes). The device 104 is configured to process the output of the motion sensor 212 or 242 to track an accumulated orientation change. For example, the device 104 can be configured to integrate the output of one or more gyroscopes to generate accumulated orientation changes about each of the above-mentioned three axes. Because the scanner 126 and the device 104 are carried on the body of the operator 400, the accumulated orientation changes are indicative of movement of the operator 400.

The device 104 is configured to track the accumulated orientation change beginning at the time of the affirmative determination at block 310. That is, the device 104 can be configured to begin integrating gyroscope output from the motion sensor 212 or 242 in response to the affirmative determination at block 310 (e.g. simultaneously with the performance of block 315).

At block 325, the device 104 is configured to determined whether the accumulated orientation since the affirmative determination at block 310 exceeds a predefined threshold. Referring to FIG. 4B, as will be understood by those skilled in the art, when the operator 400 has retrieved the objects identified by the task instruction presented at block 315 (i.e. two ACME parachutes, in the present example), the operator 400 will be required to pivot to face the cart 408 and place the objects in the cart 408. The pivoting motion required for the operator 400 to face the cart 408 indicates that the task of retrieving the objects is complete. The determination at block 325 enables the device 104 to automatically detect the completion of the retrieval task, without requiring the operator 400 to provide an explicit indication of completion beyond moving to face the cart 408.

Figure 5A:
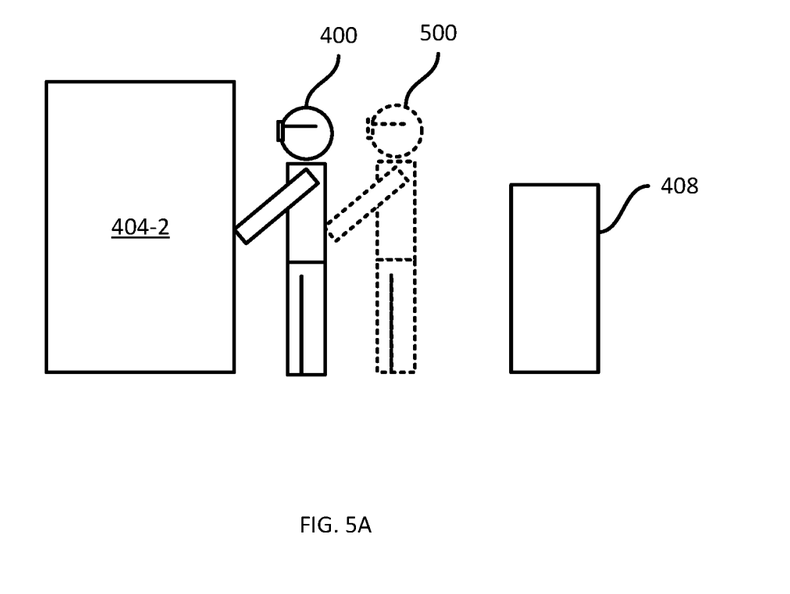
FIG. 5A is an updated side view of the portion of the facility of FIG. 4A.
Figure 5B:
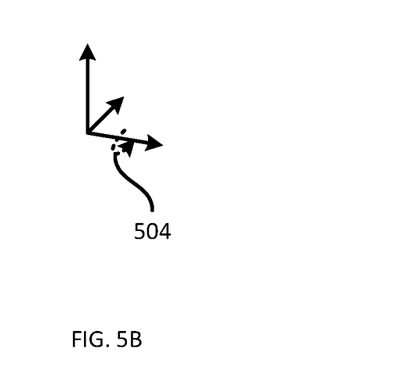
FIG. 5B is a schematic illustrating accumulated orientation data generated via the method of FIG. 3.

Referring to FIG. 5A, an initial position 500 of the operator 400 (as shown in FIG. 4B) is illustrated, along with a current position of the operator 400. As seen in FIG. 5A, the operator 400 has approached the rack 404-2 to retrieve the objects identified by the primary instruction presented at block 315. FIG. 5B illustrates accumulated orientation data 504 generated by the device 104 as a result of the movement shown in FIG. 5A. As seen in FIG. 5B, because the operator 400 is facing in the same direction as in the initial position 500, the accumulated orientation data 504 indicates a change in orientation about one axis of, for example, 5 degrees. The threshold may be set, for example, at a value of between 40 degrees and 100 degrees (e.g. 60 degrees), and the accumulated orientation change associated with FIGS. 5A and 5B does not exceed the threshold. The determination at block 325 is therefore negative, and the device 104 continues to track the accumulated orientation change at block 320. The HUD 148 therefore also continues to present the primary task instruction shown in FIG. 4C.

Figure 6A:
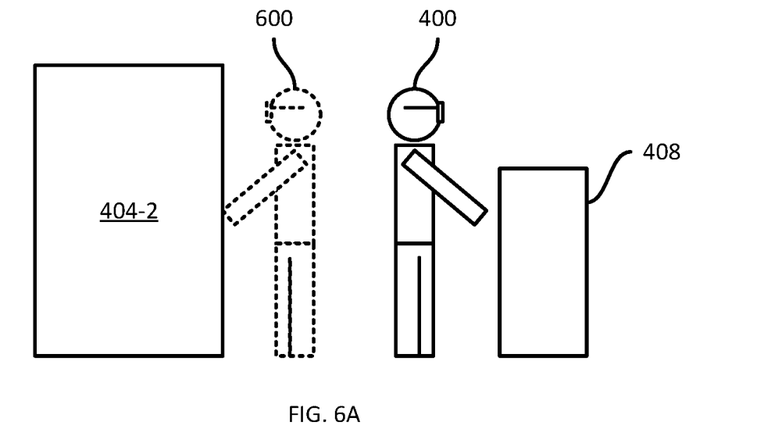
FIG. 6A is a further updated side view of the portion of the facility of FIG. 5A.
Figure 6B:
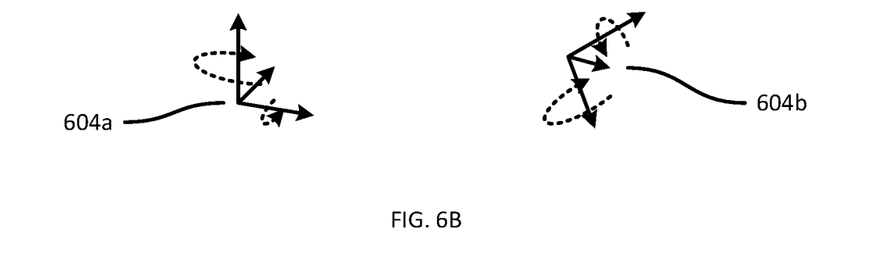
FIG. 6B is a schematic illustrating additional examples of accumulated orientation data generated via the method of FIG. 3.

Turning to FIG. 6A, a previous position 600 of the operator 400 is shown (that is, the position of the operator 400 in FIG. 5A), as well as the current position of the operator 400. Of particular note, in FIG. 6A the operator 400 has pivoted away from the rack 404-2 to face the cart 408, having retrieved the objects indicated by the primary task instruction shown in FIG. 4C. As noted above, the device 104 is configured to continue tracking accumulated orientation changes at block 320 until an affirmative determination at block 325. Thus, as shown in FIG. 6B, the accumulated orientation change generated following the pivot of the operator 400 shown in FIG. 6A is represented by accumulated orientation change data 604a. The data 604a defines the 5-degree rotation mentioned earlier, as well as a rotation (e.g. of 170 degrees) about a second axis.

At a further performance of block 325, the device 104 is configured to compare each of the rotations in the accumulated orientation data 604a to the previously mentioned threshold. As will now be apparent, the rotation of 170 degrees shown in FIG. 6B exceeds the threshold, and the determination at block 325 is therefore affirmative.

Before discussing block 330 of the method 300, it is noted that FIG. 6B also illustrates another example of accumulated orientation data 604b. While the data 504 and 604a include axes that are aligned with the operator 400 (e.g. a substantially vertical axis, and two substantially horizontal axes orthogonal to one another), the performance of the method 300 does not require calibration of the motion sensors 212 and 242. Further, the performance of the method 300 does not require knowledge of the physical placement of the motion sensors 212 and 242. That is, the device 104 and/or the HUD 148 can be placed in various positions and orientations on the operator without affecting the performance of the method 300. The orientation data obtained at block 320 may therefore not be aligned with the operator 400. The accumulated orientation data 604b, for example, is defined as angles of rotation about axes that are inclined relative to the vertical and horizontal axes shown in connection with the data 604a. Because the threshold at block 325 is assessed for each axis of the orientation data, however, the orientation of the axes represented in the data 604b relative to the physical environment of the operator 400 is not relevant, and the motion sensors 212 and 242 need not be calibrated. The data 604b, for example, indicates a rotation of about 140 degrees about a first axis, and a rotation of about 50 degrees about a second axis. The determination at block 325 is therefore affirmative, despite the orientation of the axes defined by the data 604b.

Figure 6C:
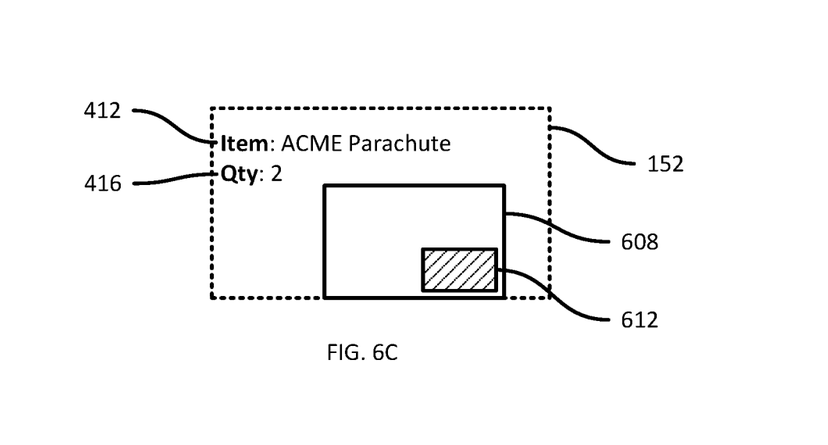
FIG. 6C is a schematic of further information presented by the wearable heads-up-display of FIG. 1.

Referring again to FIG. 3, at block 330 following an affirmative determination at block 325, the device 104 is configured to cease tracking the accumulated orientation change. That is, the accumulated orientation change is reset. The device 104 is further configured to present a secondary task instruction that follows the primary task instruction in the sequence. Referring to FIG. 6C, an example of the secondary task instruction is illustrated, as presented on the HUD 148 (specifically, at the region 152 of the HUD 148). The secondary task instruction includes the identifiers 412 and 416 mentioned above, as well as a visual indication 608 of where in the cart 408 to place the retrieved objects. The visual indication 608 may include, for example, a highlighted region 612 corresponding to a particular bin or the like on the cart 408 into which the retrieved objects are to be placed. Following the performance of block 330, the device 104 can return to block 310 to await detection of a further task initiation event, to present the next sequence of task instructions.

In other embodiments, the instruction sequence obtained at block 305 includes information defining a plurality of primary and secondary tasks. In such embodiments, rather than ceasing to track the accumulated orientation change at block 330, the device 104 continues to track the accumulated orientation change to detect sufficient motion to trigger presentation of the next primary task instruction. For example, having detected an angular change sufficient to trigger an affirmative determination at block 325, the device 104 can continue tracking the accumulated orientation change and repeat block 325 to determine whether to present the next primary task instruction (after the first secondary task instruction was presented at block 330).

Further variations to the above systems and methods are contemplated. For example, the task instructions need not be presented on the HUD 148, but can be presented to the operator 400 via the display 112, the speaker 124, or a combination thereof. In further embodiments, the HUD 148 itself performs the method 300. That is, the processor 230 of the HUD 148 performs each of blocks 305 to 330 independently of the mobile device 104 (rather than the HUD 148 acting as a peripheral to the mobile device 104, with the mobile device 104 itself performing the computations associated with the method 300).

In some embodiments, the sequence of task instructions need not be retrieved at block 305. Instead, the device 104 can be configured to retrieve only one task at a time, and to request the next task in the sequence from the server 160 only upon completion of the previous task. Thus, for example, the device 104 can be configured to request the secondary task following an affirmative determination at block 325.

Various other task initiation events are contemplated for detection at block 310, instead of the barcode scan mentioned above. Another example of a task initiation event include the detection of an audio signal, such as the operator 400 speaking a predetermined string (e.g. text or digits affixed to the rack 404-2). In such embodiments, the input assembly referred to above includes the microphone 116. A further example of a task initiation event includes the monitoring of a footstep counter by the device 104 (the counter can be a component of the device 104 itself, e.g. implemented via additional processing of IMU data, or can be physically separate). When no footsteps are detected for a predefined length of time (e.g. 2 seconds), the operator 400 is assumed to have arrived at the location shown in FIG. 4A and stopped to receive further instructions. In further examples, the input assembly includes an image sensor, and the task initiation event includes data detected in an image captured by the HUD 148. The data detected in the image can be the above-mentioned barcode or another machine-readable indicium (e.g. a QR code), or another suitable physical feature of a rack 404 or other structure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, in a computing device, of automatic contextual task presentation, the method comprising:
   storing, in a memory of the computing device, a sequence of task instructions for presentation to an operator of the computing device via an output assembly connected to the mobile computing device;
   detecting, via an input assembly of the computing device, a task initiation event;
   responsive to detecting the task initiation event:
      controlling the output assembly to present a first task instruction from the sequence to the operator;
      obtaining orientation data corresponding to the operator from an inertial measurement unit associated with the computing device;
      based on the orientation data, tracking an accumulated operator orientation change since the detection of the task initiation event; and
      when the accumulated operator orientation change exceeds a threshold, controlling the output assembly to present a second task instruction from the sequence to the operator.

2. The method of claim 1, wherein the computing device includes at least one of a mobile computing device and a heads-up display (HUD).

3. The method of claim 1, wherein the output assembly includes a heads-up-display (HUD) connected to the computing device; and
   wherein controlling the output assembly to present the first and second task instructions includes transmitting the first and second task instructions to the HUD.

4. The method of claim 1, wherein the input assembly includes a data capture assembly connected to the computing device, and wherein detecting the task initiation event includes capturing, via the data capture assembly, data from a machine-readable indicium.

5. The method of claim 4, wherein the machine-readable indicium is a barcode.

6. The method of claim 1, wherein the first task instruction defines a pick operation, and includes a location on a support structure, an object identifier and a quantity.

7. The method of claim 1, wherein the second task instruction defines a place operation, and includes a location on a cart.

8. The method of claim 1, wherein obtaining the orientation data includes collecting the orientation data from the inertial measurement unit.

9. The method of claim 3, wherein obtaining the orientation data includes receiving the orientation data from the HUD; wherein the HUD includes the inertial measurement unit.

10. The method of claim 1, wherein detecting the task initiation event includes detecting an audible signal via a microphone of the mobile computing device.

11. The method of claim 1, further comprising: when the accumulated operator orientation change exceeds a threshold, resetting the accumulated orientation change.

12. A computing device, comprising:
a memory storing a sequence of task instructions for presentation to an operator of the computing device via an output assembly connected to the computing device;
an input assembly configured to detect a task initiation event;
a processor connected to the sensor and the memory;
wherein the processor is configured to:
responsive to receipt of a detection of the task initiation event from the input assembly:
control the output assembly to present a first task instruction from the sequence to the operator;
obtain orientation data corresponding to the operator from an inertial measurement unit;
based on the orientation data, track an accumulated operator orientation change since the detection of the task initiation event; and
when the accumulated operator orientation change exceeds a threshold, control the output assembly to present a second task instruction from the sequence to the operator.

13. The computing device of claim 12, further comprising at least one of a mobile computing device housing and a heads-up display (HUD) frame supporting the memory, the input assembly, the processor and the output assembly.

14. The mobile computing device of claim 12, wherein the output assembly includes a heads-up-display (HUD) connected to the computing device; and
wherein the processor is configured to transmit the first and second task instructions to the HUD.

15. The mobile computing device of claim 12, wherein the sensor includes a data capture device, and wherein the processor is configured, to detect the task initiation event, to receive data captured from a machine readable indicium from the data capture device.

16. The mobile computing device of claim 15, wherein the machine-readable indicium is a barcode.

17. The mobile computing device of claim 12, wherein the first task instruction defines a pick operation, and includes a location on a support structure, an object identifier and a quantity.

18. The mobile computing device of claim 12, wherein the second task instruction defines a place operation, and includes a location on a cart.

19. The mobile computing device of claim 12, further comprising the inertial measurement unit.

20. The mobile computing device of claim 14, wherein the processor is configured, to obtain the orientation data, to receive the orientation data from the HUD.

21. The mobile computing device of claim 12, further comprising a microphone;
wherein the processor is configured, to detect the task initiation event, to detect an audible signal via the microphone.

22. The mobile computing device of claim 12, wherein the processor is further configured, when the accumulated operator orientation change exceeds a threshold, to reset the accumulated orientation change.

* * * * *